(12) United States Patent
Unno et al.

(10) Patent No.: US 10,315,491 B2
(45) Date of Patent: Jun. 11, 2019

(54) FOAM MOLDED BODY, DUCT FOR AIR CONDITIONER, AND DUCT FOR VEHICLE AIR CONDITIONER

(71) Applicant: NISSAN MOTOR CO., LTD., Yokohama-shi, Kanagawa (JP)

(72) Inventors: Haruo Unno, Kanagawa (JP); Isao Yamamoto, Kanagawa (JP); Hideki Agata, Kanagawa (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 229 days.

(21) Appl. No.: 15/101,144

(22) PCT Filed: Oct. 16, 2014

(86) PCT No.: PCT/JP2014/077554
§ 371 (c)(1),
(2) Date: Jun. 2, 2016

(87) PCT Pub. No.: WO2015/083447
PCT Pub. Date: Jun. 11, 2015

(65) Prior Publication Data
US 2018/0170148 A1      Jun. 21, 2018

(30) Foreign Application Priority Data

Dec. 3, 2013    (JP) .................................. 2013-250218

(51) Int. Cl.
*B60H 1/00*         (2006.01)
*B29C 49/00*        (2006.01)
*C08J 9/12*         (2006.01)
*C08J 9/00*         (2006.01)

(52) U.S. Cl.
CPC ...... *B60H 1/00564* (2013.01); *B29C 49/0005* (2013.01); *B60H 1/00028* (2013.01);
(Continued)

(58) Field of Classification Search
CPC ............ B60H 1/00564; B60H 1/00028; B60H 1/00207; B29C 49/0005; C08J 9/12;
(Continued)

(56) References Cited

U.S. PATENT DOCUMENTS 5,527,573 A * 6/1996 Park ........................ C08J 9/144
                                                428/314.4
6,432,525 B1 * 8/2002 Gokuraku ............... B29C 49/04
                                                 428/318.6

(Continued)

FOREIGN PATENT DOCUMENTS

EP    2 246 175 A1    11/2010
JP    60-011330 A      1/1985
(Continued)

*Primary Examiner* — Yan Lan
(74) *Attorney, Agent, or Firm* — Foley & Lardner LLP

(57) ABSTRACT

A foam molded body has a cylindrical shape, is produced by foaming a resin, and has a mass per unit area of 0.090 g/cm² or less and an expansion ratio of from 3.4 to 40 times. A duct for an air conditioner and a duct for a vehicle air conditioner include a foam molded body that has a cylindrical shape, is produced by foaming a resin, and has a mass per unit area of 0.090 g/cm² and an expansion ratio of from 3.4 to 40 times.

20 Claims, 3 Drawing Sheets

(52) U.S. Cl.
CPC ............ B60H 1/00207 (2013.01); *C08J 9/00* (2013.01); *C08J 9/12* (2013.01); *C08J 2300/22* (2013.01); *C08J 2323/06* (2013.01); *C08J 2323/12* (2013.01); *C08L 2203/14* (2013.01)

(58) Field of Classification Search
CPC ................ C08J 2300/22; C08J 2323/06; C08J 2323/12; C08J 2323/14; C08J 2205/052; C08J 9/228; C08J 2207/00; C08J 2205/00; C08J 9/00
See application file for complete search history.

(56) References Cited

U.S. PATENT DOCUMENTS

| | | |
|---|---|---|
| 2013/0032963 A1 | 2/2013 | Tokiwa et al. |
| 2014/0335295 A1 | 11/2014 | Onodera |

FOREIGN PATENT DOCUMENTS

| | | |
|---|---|---|
| JP | 2004-116956 A | 4/2004 |
| JP | 2004-116959 A | 4/2004 |
| JP | 2005-193726 A | 7/2005 |
| JP | 2007-136966 A | 6/2007 |
| JP | 2009-275119 A | 11/2009 |
| JP | 3157009 U | 1/2010 |
| JP | 2010-167628 A | 8/2010 |
| JP | 2011-201085 A | 10/2011 |
| WO | WO 99/28111 A1 | 6/1999 |
| WO | WO 2013/073461 A1 | 5/2013 |

* cited by examiner

FOAM MOLDED BODY, DUCT FOR AIR CONDITIONER, AND DUCT FOR VEHICLE AIR CONDITIONER

TECHNICAL FIELD

The present invention relates to a foam molded body, a duct for an air conditioner and a duct for a vehicle air conditioner. In more detail, the present invention relates to a foam molded body that can offer both good sound absorption and good heat insulation and a duct for an air conditioner and a duct for a vehicle air conditioner that include the foam molded body.

BACKGROUND ART

A foam duct has been proposed that is produced by blow molding in which a resin is foamed at a high expansion ratio and is formed into a desired shape (see Patent Document 1).

The foam duct has connection openings at both ends that are configured to fit in other components of a vehicle air conditioner and a duct body between the connection openings that defines a three-dimensionally winding conduit as an air passage. The connection openings and the duct body are made of foam cells having an average foam particle size of from 100 μm to 300 μm, which are produced by blow molding from a single-layer parison foamed by physical foaming.

CITATION LIST

Patent Document

Patent Document 1: JP 2005-193726A

SUMMARY OF INVENTION

Technical Problem

However, a study by the present inventors revealed that the foam duct described in Patent Document 1 has a problem of insufficient sound absorption.

The present invention was made in view of such problems with the prior art. It is therefore an object of the present invention to provide a foam molded body that can offer both good sound absorption and good heat insulation, and a duct for an air conditioner and a duct for a vehicle air conditioner that include the foam molded body.

Solution to Problem

The present inventors conducted a keen study to achieve the above-described object. As a result, they found that the above-described object is achieved by a foam molded body that has a cylindrical shape, is produced by foaming a resin and has a mass per unit area of from 0.045 g/cm² to 0.090 g/cm², an expansion ratio of from 3.4 to 6.7 times and a closed cell ratio of from 79% to 86%. The present invention was thus completed.

That is, the foam molded body of the present invention has a cylindrical shape, is produced by foaming a resin, and has a mass per unit area of from 0.045 g/cm² to 0.090 g/cm², an expansion ratio of from 3.4 to 6.7 times and a closed cell ratio of from 79% to 86%.

Further, the duct for an air conditioner or the duct for a vehicle air conditioner of the present invention includes the above-described foam molded body of the present invention.

Advantageous Effects of Invention

According to the present invention, the foam molded body has a cylindrical shape, is produced by foaming a resin, and has a mass per unit area of from 0.045 g/cm² to 0.090 g/cm², an expansion ratio of from 3.4 to 6.7 times and a closed cell ratio of from 79% to 86%. Therefore, it is possible to provide a foam molded body that can offer both good sound absorption and good heat insulation, and a duct for an air conditioner and a duct for a vehicle air conditioner that include the foam molded body.

DESCRIPTION OF EMBODIMENT

Figure 1:
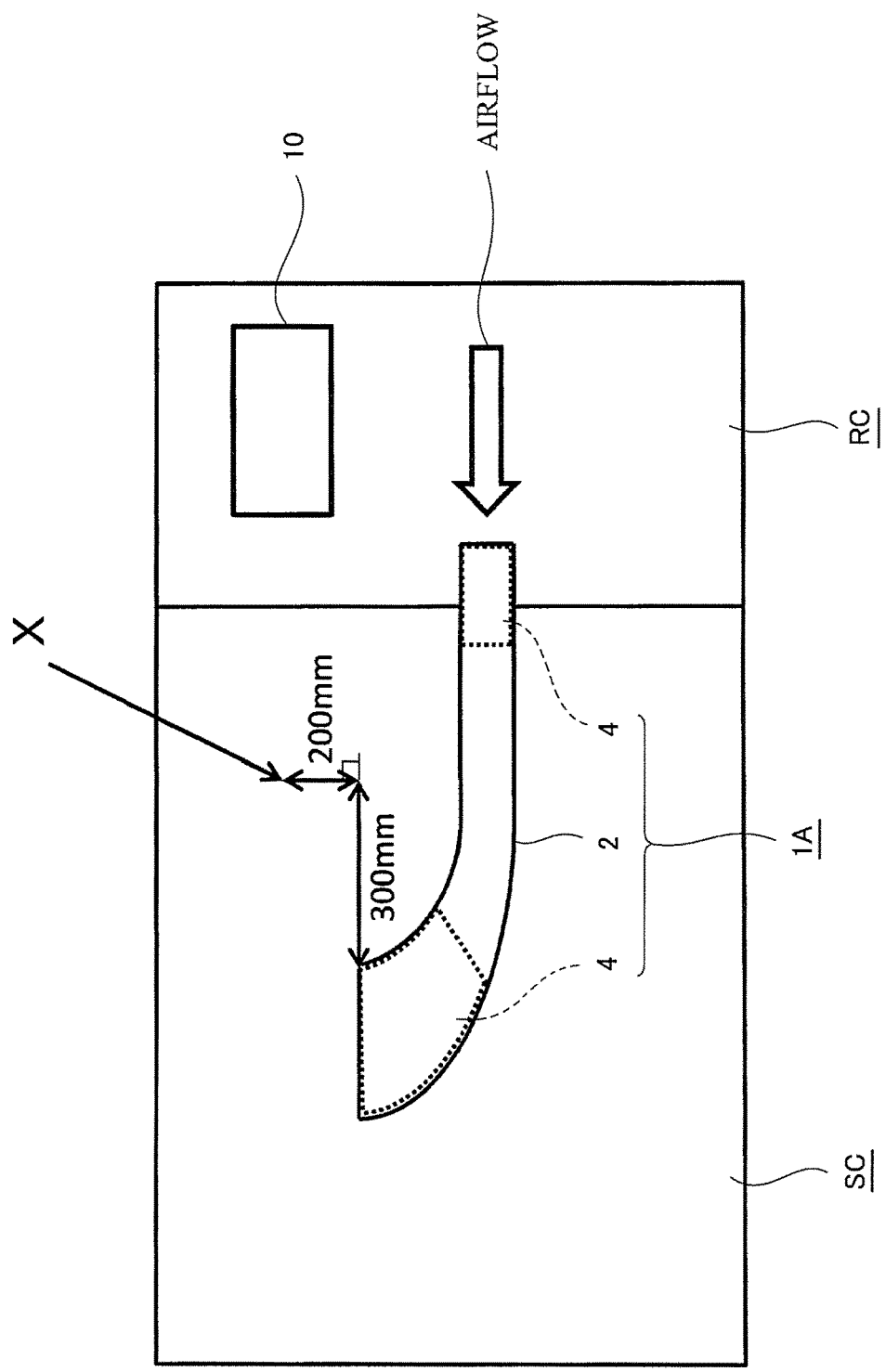
FIG. 1 is an explanatory view illustrating an overview of a sound absorption performance evaluation test that simulates an airflow noise.

Hereinafter, a foam molded body according to an embodiment of the present invention, and a duct for an air conditioner and a duct for a vehicle air conditioner including the foam molded body will be described in detail.

First, the foam molded body according to an embodiment of the present invention will be described in detail. The foam molded body of this embodiment has a cylindrical shape, is formed by foaming a resin, and has a mass per unit area of 0.090 g/cm² or less and an expansion ratio of from 3.4 to 40 times.

When the mass per unit area is equal to or less than 0.090 g/cm² and the expansion ratio ranges from 3.4 to 40 times, it is possible to achieve both good sound absorption and good heat insulation.

When the mass per unit area is greater than 0.090 g/cm², it is not possible to achieve good sound absorption and good heat insulation at the same time. When the expansion ratio is less than 3.4 times, it is not possible to ensure the desired heat insulation. Further, when the expansion ratio is greater than 40 times, the foam molded body cannot be produced stably by current blow molding techniques.

It is considered that good sound absorption and good heat insulation can be achieved at the same time because the foam molded body has a high cell ratio and thus has, for example, high vibration absorption performance. However, the scope of the present invention also includes foam molded bodies in which the above-described advantageous effect is obtained through a different mechanism.

For example, the mechanism of sound absorption has not yet been revealed because there are a variety of influential factors such as expansion ratio (sound energy loss due to vibration of cell walls), surface stiffness (sound energy loss due to vibration of a skin layer) and mass per unit area (sound transmission loss due to low density) and the degree of influence of such factors is assumed to vary depending on frequency.

When the foam molded body is applied to an air conditioner duct used in air conditioners such as heating, ventilating and air conditioning systems (HVAC), for example, it is also advantageous in that such ducts can reduce the weight and reduce or eliminate condensation on the outer surface of the ducts.

When the foam molded body is applied to a vehicle air conditioner duct used in air conditioners such as vehicle heating, ventilating and air conditioning systems (HVAC), for example, it is also advantageous that such ducts can reduce or prevent the operating noise of a vehicle air conditioner from reaching a vehicle compartment, so that the vehicle compartment can be improved to be more comfortable. Further, when the foam molded body is applied to a vehicle air conditioner duct, for example, it decreases the temperature difference at an inlet/outlet opening of the vehicle air conditioner duct. This improves the air conditioning efficiency of the air conditioner so that the vehicle compartment can be improved to be more comfortable. Further, when the foam molded body is applied to a vehicle air conditioner duct for electric vehicles, for example, it can extend the cruising distance of electric vehicles as a result of the improvement in the air conditioning efficiency.

In terms of improving the sound absorption, it is preferred that the foam molded body of this embodiment has a mass per unit area of 0.075 g/cm$^2$ or less. Further, in terms of improving the productivity, it is preferred that the mass per unit area is equal to or greater than 0.018 g/cm$^2$.

In terms of improving the heat insulation and the productivity, it is preferred that the foam molded body of this embodiment has an expansion ratio of from 3.4 to 10 times, more preferably from 3.4 to 8 times, and yet more preferably from 5 to 8 times.

The relationship between the expansion ratio and heat insulation is described in more detail. The heat conductivity of a foam material is roughly consistent with its theoretical value obtained from a compound rule. That is, the heat conductivity of the foam material $\lambda_c$ is calculated by the following equation (I), where $\lambda_m$ is the heat conductivity of the base material (e.g. polypropylene) of the foam material, $\lambda_g$ is the heat conductivity of the air, and $V_g$ is the volume fraction of the air (porosity).

$$\lambda_c = V_g \cdot \lambda_g + (1 - V_g) \cdot \lambda_m \quad (I)$$

As seen in the equation (I), heat conductivity decreases as the expansion ratio increases, and a better heat insulation is obtained at a higher expansion ratio. While there is no further improvement to heat insulation beyond an expansion ratio of 8, it is preferred that the expansion ratio ranges from 3.4 to 8 times in order to maintain the strength at a level required for vehicle air conditioner ducts. As for ducts for home air conditioners, the layout of which is less constrained, it is preferred that the expansion ratio ranges from 3.4 to 10 times. In terms of cost reduction, it is preferred that the expansion ratio is equal to or less than 10 times.

When the foam molded body has an expansion ratio of 5 times or more, the heat insulation is further improved. However, as described above, there is no further improvement to heat insulation beyond an expansion ratio of 8 times or more. Therefore, keeping the expansion ratio within the range of from 5 to 8 times enables a further improvement in heat insulation while improving the productivity at the same time. In terms of cost reduction, it is preferred that the expansion ratio is equal to or less than 10 times.

In terms of improving heat insulation and strength, it is preferred that the foam molded body of this embodiment has a closed cell ratio of 60% or more, more preferably 75% or more. In terms of improving the productivity, it is preferred that the closed cell ratio is equal to or less than 90%.

As used herein, the term "closed cell ratio" means the ratio of the volume of closed cells to the volume of all cells in a porous material such as a foam molded body. A closed cell refers to a cell (pore) that is completely enclosed by cell walls among cells in a porous material such as a foam molded body. For example, the closed cell ratio can be defined as being measured by the following method. However, the definition is not limited thereto.

First, as a sample to be measured, a piece in 10×10×2 mm is cut out from the center part of a center wall of a foamed and blow-molded product (shape: cylinder, height: 700 mm, inner diameter: 100 mm, thickness: X mm (X≥2)). Then, the true density (D) of the sample was measured by fluid substitution method (pycnometer method). Specifically, an automatic wet true densitometer (auto true denser MAT-7000) and water are used as a device and a solvent, respectively. The sample and the solvent are charged into a cell of the device, and the cell is vacuumed so that the solvent penetrates into the pores and interparticle gaps of the sample. Thereafter, the solvent is added to a certain liquid level, and the weight is measured. The solvent temperature is measured at the same time, and the true density (D) and the open cell volume (Voc) are measured from the weight of the solvent substituted by the sample (1). Then, the actual size of the sample is measured and the apparent (geometric) volume (Vg) of the sample is calculated (2). Further, the weight (W) of the sample is measured by means of an electronic balance (3). Thereafter, the closed cell volume (Vc) and the closed cell ratio (Cc) are calculated from the values obtained in (1) to (3) by the following equations (II) and (III). The average of five samples is determined.

$$Vc = Vg - W/D - Voc \quad (II)$$

$$CC = Vc/Vg \times 100 \quad (III)$$

In terms of improving heat insulation, it is preferred that the foam molded body of this embodiment has an average cell size of from 50 µm to 700 µm. When the average cell size is less than 50 µm, the cell walls are so thin that they may be broken when the foam molded body is bent, which causes air leakage. In contrast, when the average cell size is greater than 700 µm, the cell walls are so thick that they may be broken when the foam molded body is bent, which causes air leakage.

As used herein, the term "average cell size" means the average of the cells in a foam molded body. For example, the average cell size can be defined as being measured by the following method, but the definition is not limited thereto.

First, as a sample to be measured, a piece in 10×10×A mm is cut out from the center part of a center wall of a foamed and blow-molded product (shape: cylinder, height: 700 mm, inner diameter: 100 mm, thickness: A mm). Then, the average of the cell size a in the thickness direction of the sample and the average of the cell size c in the longitudinal direction are respectively determined according to the following method, and the average of a and c is determined as the cell size. Specifically, the hollow defining part of the molded body is divided into two approximately equal parts in the direction (longitudinal direction) perpendicular to the circumferential direction and the thickness direction of the sample, so that two vertical cross sections are obtained. Then, the pair of opposed two cross sections are respectively enlarged and projected by a microscope or the like. A line segment (a) is drawn on the projected image in the thickness direction across the overall thickness of foam blow-molded body approximately at the center in the width direction perpendicular to the thickness direction, and the length L3 of the line segment (a) on the image is measured. When the thickness approximately at the center in the width direction is significantly thinner than at the other parts in the projected image, the image is not used for the measurement of physical properties, and another part is newly projected for the measurement. Then, a double line is drawn across the overall thickness of the molded body, which is centered on and parallel to the line segment (a) and has a width of the length L3. All of the cells present in the double line are measured (except for pores intersecting the double lines). Each cell is measured for the maximum inner size in the thickness direction and the maximum inner size in the longitudinal direction. The measured values are divided by the magnification factor used for making the enlarged image, so that the cell size a and the cell size c of each cell are determined. The average of the cell sizes of samples from five molded bodies measured by the above-described method is determined as the average cell size.

When the closed cell ratio is equal to or greater than 60% and the average cell size ranges from 50 μm to 700 μm, the foam molded body does not break but elastically deforms moderately when it is bent. This is suitable for ducts for vehicle air conditioners, which are complicated to dispose of. However, the properties are not limited thereto.

Resins that are suitably used for the foam molded body of this embodiment include thermoplastic resins since they provide good moldability. Preferred examples of such thermoplastic resins include polyolefin resins since they are inexpensive. However, the resin is not limited thereto, and other thermoplastic resins that can be used include, for example, polyvinyl chloride resins such as polyvinyl chloride, polyvinyl acetate and polyvinylidene chloride, polyamide, polyacetal, polycarbonate, polyesters such as polybutylene terephthalate and polyethylene terephthalate, polystyrene, polyethylene oxide/polystyrene alloys, polytetrafluoroethylene, polyacrylonitrile-butadiene resins, polyacrylonitrile-styrene resins, polyacrylic resins, modified polyphenylene ether, polyurethane, and the like. Among polyolefin resins, polypropylene and polyethylene and the like are preferably used since they are inexpensive and there are established blow molding techniques for these resins. Furthermore, an elastomer or a rubber may be further added to an alloy of such thermoplastic resins or such a thermoplastic resin as a main component.

Although there are no particular limitations, the thickness of the foam molded body of this embodiment is preferably large from the perspective of heat insulation since thermal resistance, which indicates heat insulation, is determined as a product of heat conductivity and thickness. As ducts for vehicle air conditioners, the thickness is typically within the range of approximately from 0.7 mm to 5.0 mm due to a constraint in the outer diameter for a layout that can prevent interference with surrounding components and a constraint in the inner diameter for reducing the flow resistance of air. In terms of ensuring sound absorption and heat insulation and improving productivity, the thickness is preferably within the range of from 2 mm to 5.0 mm.

In terms of improving sound absorption, it is preferred that the foam molded body of this embodiment has a flexural modulus of from 100 MPa to 500 MPa, more preferably from 200 MPa to 400 MPa, yet more preferably from 250 MPa to 350 MPa, although it is not particularly limited thereto.

Further, in terms of improving sound absorption, it is preferred in the foam molded body of this embodiment that the value of the relation $T/H \times (H-T)^2$ (which satisfies $T/H<1$), where T is the thickness (mm) and H is the expansion ratio, is greater than 0.75 and less than 13, more preferably within the range of from 0.8 to 10, yet more preferably within the range of from 1.0 to 8, particularly within the range of from 3 to 6. However, the properties are not particularly limited thereto.

Next, the duct for an air conditioner and the duct for a vehicle air conditioner (hereinafter also referred to as simply "ducts") according to an embodiment of the present invention will be described in detail. The description of the configuration that has been already described in the above-described embodiment is omitted. The duct for an air conditioner and the duct for a vehicle air conditioner according to this embodiment include the foam molded body according to the above-described embodiment of the present invention. The ducts of this embodiment may further include a sound absorbing urethane inner lining on the inner side and may further include an anti-condensation urethane outer lining on the outer side. The ducts of this embodiment may consist solely of the foam molded body, i.e. they may be made of the foam molded body alone.

By using the foam molded body according to the above-described embodiment of the present invention, good sound absorption and good heat insulation can be achieved at the same time. Compared with a duct composed of a solid molded body and a sound absorbing urethane pasted on the inner side thereof, the airflow noise can be reduced while the pink noise remains approximately at the same level. Therefore, the lining sound absorbing urethane can be omitted, which enables a reduction in weight. Further, another advantage is that condensation on the outer side of the ducts can be reduced or prevented. Therefore, an outer lining urethane can be potentially omitted even when the ducts are intended to be disposed in the vicinity of an electrical system. Further, the operating noise of a vehicle air conditioner is reduced or prevented from reaching the vehicle compartment, so that the vehicle compartment can be improved to be more comfortable. Further, the temperature difference at an inlet and outlet openings of the duct for a vehicle air conditioner is decreased. This improves the air conditioning efficiency of the air conditioner so that the vehicle compartment can be improved to be more comfortable. Further, the cruising distance of an electric vehicle can be extended as a result of the improvement of the air conditioning efficiency.

EXAMPLES

Hereinafter, the present invention will be described in more detail with examples and comparative examples.

Example 1

A foam molded body of the example was obtained from solid polypropylene by foaming and blow molding. The foam molded body had a thickness of 3 mm, a mass per unit area of 0.045 g/cm², an expansion ratio of 6.3 times, a closed cell ratio of 83% and an average cell size of 164 μm. The closed cell ratio and the average cell size were measured by the above-described methods. The same applies to the following.

Example 2

A foam molded body of the example was obtained from solid polypropylene by foaming and blow molding. The foam molded body had a thickness of 4 mm, a mass per unit area of 0.072 g/cm², an expansion ratio of 5 times, a closed cell ratio of 86% and an average cell size of 150 μm.

Example 3

A foam molded body of the example was obtained from solid polypropylene by foaming and blow molding. The foam molded body had a thickness of 4 mm, a mass per unit area of 0.060 g/cm², an expansion ratio of 6.7 times, a closed cell ratio of 81% and an average cell size of 173 μm.

Example 4

A foam molded body of the example was obtained from solid polypropylene by foaming and blow molding. The foam molded body had a thickness of 5 mm, a mass per unit area of 0.075 g/cm², an expansion ratio of 6.5 times, a closed cell ratio of 79% and an average cell size of 187 μm.

Example 5

A foam molded body of the example was obtained from solid polypropylene by foaming and blow molding. The foam molded body had a thickness of 4 mm, a mass per unit area of 0.090 g/cm², an expansion ratio of 3.4 times, a closed cell ratio of 80% and an average cell size of 133 μm.

Example 6

A foam molded body of the example was obtained from solid polypropylene by foaming and blow molding. The foam molded body had a thickness of 5 mm, a mass per unit area of 0.090 g/cm², an expansion ratio of 4.8 times, a closed cell ratio of 83% and an average cell size of 148 μm.

Comparative Example 1

A molded body of the comparative example was obtained from solid polypropylene by blow molding. The molded body had a thickness of 1.7 mm, a mass per unit area of 0.153 g/cm² and an expansion ratio of 1 time.

Comparative Example 2

A molded body of the comparative example was obtained by pasting a sound absorbing urethane lining on the inner side of a duct opening of the molded body of Comparative example 1.

Comparative Example 3

A molded body of the comparative example was obtained from solid polypropylene by blow molding. The molded body had a thickness of 0.8 mm, a mass per unit area of 0.072 g/cm² and an expansion ratio of 1 time.

Comparative Example 4

A molded body of the comparative example was obtained by pasting a sound absorbing urethane lining on the inner side of a duct opening of the molded body of Comparative example 3.

Comparative Example 5

A foam molded body of the example was obtained from solid polypropylene by foaming and blow molding. The foam molded body had a thickness of 3 mm, a mass per unit area of 0.108 g/cm², an expansion ratio of 2.5 times, a closed cell ratio of 85% and an average cell size of 129 μm.

Some of the specifications of the examples and comparative examples are shown in Table 1. In Table 1, a larger value of "Δ (dB)" indicates better sound absorption performance. Further, the "(1) Airflow" in the table is a simulation of an airflow noise, in which an air flow rate of 4 m³/min is a simulation of a low airflow and an air flow rate of 7 m³/min is a simulation of a high airflow. The "(2) Pink Noise" is a simulation of the operating noise of a heating, ventilating and air conditioning system (HVAC).

TABLE 1

| | Thickness (mm) | Mass Per Unit Area (g/cm²) | Expansion Ratio (times) | Closed Cell Ratio (%) | Average Cell Size (μm) |
|---|---|---|---|---|---|
| Example 1 | 3 | 0.045 | 6.3 | 83 | 164 |
| Example 2 | 4 | 0.072 | 5 | 86 | 150 |
| Example 3 | 4 | 0.060 | 6.7 | 81 | 173 |
| Example 4 | 5 | 0.075 | 6.5 | 79 | 187 |
| Example 5 | 4 | 0.090 | 3.4 | 80 | 133 |
| Example 6 | 5 | 0.090 | 4.8 | 83 | 148 |
| Comparative example 1 | 1.7 | 0.153 | 1 | — | — |
| Comparative example 2 | 1.7 | 0.153 | 1 | — | — |
| Comparative example 3 | 0.8 | 0.072 | 1 | — | — |
| Comparative example 4 | 0.8 | 0.072 | 1 | — | — |
| Comparative example 5 | 3 | 0.108 | 2.5 | 85 | 129 |

| | Sound Absorption Performance ((1): vs. Comparative example 2, (2): vs. Comparative example 3) Δ (dB) | | | |
|---|---|---|---|---|
| | (1) Airflow | | (2) Pink Noise | |
| | 4 m³/min, Measuring Frequency 4000 Hz | 7 m³/min, Measuring Frequency 4000 Hz | Measuring Frequency 2780 Hz | Remarks |
| Example 1 | 5.4 | 5.7 | 1.5 | |
| Example 2 | 0.9 | 3.26 | — | |
| Example 3 | 2 | 2.91 | — | |
| Example 4 | 0.9 | 3.73 | — | |
| Example 5 | 0.54 | 4.63 | — | |
| Example 6 | 1.21 | 2.26 | — | |
| Comparative example 1 | 0 | −1.5 | — | Solid |
| Comparative example 2 | Reference | Reference | — | Solid + Sound Absorbing Urethane |
| Comparative example 3 | — | — | Reference | Solid |
| Comparative example 4 | — | — | 1.8 | Solid + Sound Absorbing Urethane |
| Comparative example 5 | 0 | 0 | 0.5 | |

(Sound Absorption Performance Evaluation Test)
(1) For the simulation of an airflow noise, samples to be measured are 1130 mm-long rear ducts with urethanes pasted on the duct openings (50 mm width on the inner surfaces around the inlet and outlet openings). As the sound source, the air flow rate at the outlet opening of the duct was set to 4 m³/min or 7 m³/min. The sound was measured by the following method. Sound pressure meter: ⅓ octave band, A-weighting characteristics. Measuring point: corresponding to the position of ears in an actual car (specifically, the point X in FIG. 1).

Figure 2:
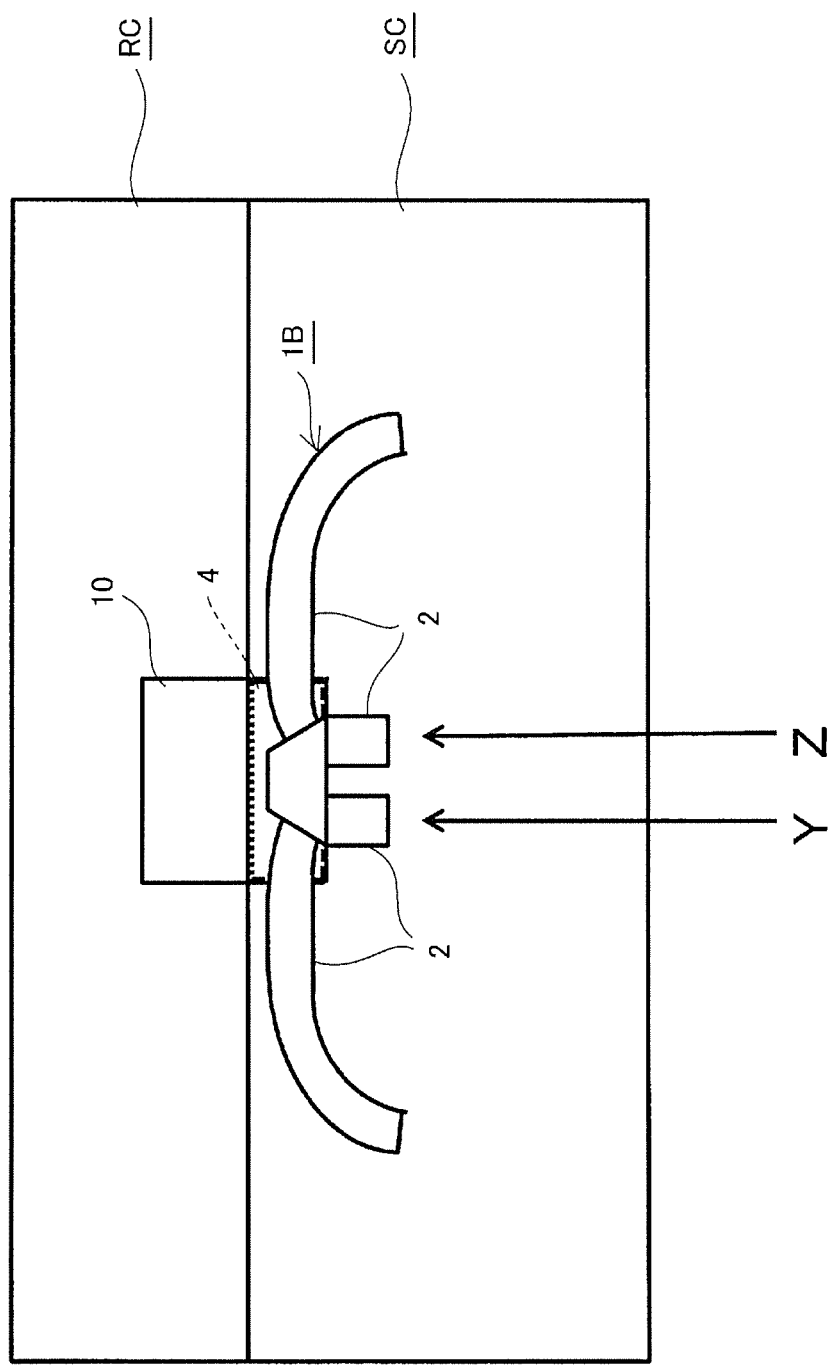
FIG. 2 is an explanatory view illustrating an overview of a sound absorption performance evaluation test that simulates an operating noise of a heating, ventilating and air conditioning (HVAC) system.

(2) For the simulation of the operating noise of a heating, ventilating and air conditioning system (HVAC), samples to be measured are center- and side-vent ducts with a urethane (15 g) pasted on the inner surface all around the part which is designed to fit in a heating, ventilating and air conditioning system (HVAC). As the sound source, a reference noise at an inlet opening of a duct was set to 70 dBA. The sound was measured by the following method. Sound pressure meter: 1/3 octave band, A-weighting characteristics. Measuring point: center vent outlet (specifically, the points Y and Z in FIG. 2). The average was determined for the evaluation.

As can be seen from Table 1, Example 1 to Example 6, which are within the scope of the present invention, exhibited good sound absorption compared to Comparative example 1 to Comparative example 5, which are out of the scope of the present invention. Further, Example 1 to Example 4, which have a mass per unit area of 0.075 g/cm$^2$ or less, exhibited a better sound absorption performance of approximately 1 dB at an air flow of 4 m$^3$/min and of approximately 3 dB at an air flow of 7 m$^3$/min.

Further, Example 1, Example 3 and Example 4, which give a value of the relation $T/H \times (H-T)^2$ (which satisfies $T/H<1$) within the range of from 1.0 to 8, exhibited a further improvement in sound absorption performance. Example 1 and Example 3, which give a value of the relation within the range of from 3 to 6, exhibited particularly good sound absorption performance.

Since the examples have a resonance frequency of 10000 Hz or more, their performance is not affected by a road noise at a frequency of approximately from 100 Hz to 500 Hz, an engine noise at a frequency of approximately from 250 Hz to 3000 Hz, an airflow noise at a frequency of approximately from 800 Hz to 1500 Hz and an operating noise of a heating, ventilating and air conditioning system (HVAC) at a frequency of approximately 2780 Hz.

(Heat Insulation Performance Evaluation Test)

The heat conductivity of foam molded bodies with different expansion ratios was measured. The obtained results are shown in FIG. 3.

Figure 3:
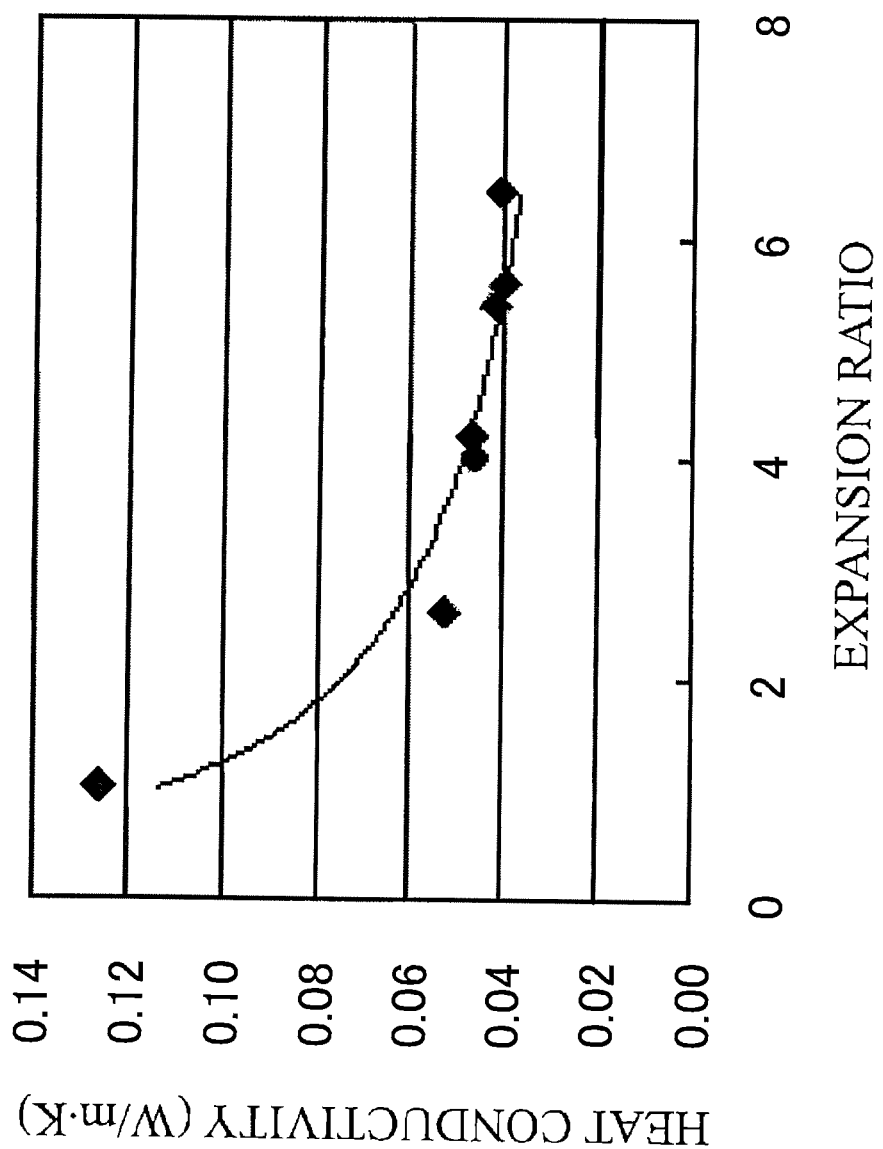
FIG. 3 is a graph illustrating the relationship between expansion ratio and heat conductivity.

As can be seen from FIG. 3, a foam molded body with an expansion ratio of 3.4 times or more exhibits good heat insulation, and a foam molded body with an expansion ratio of 5 times or more exhibits a further improvement in heat insulation. As ducts for home air conditioners, the layout of which has fewer constraints, the expansion ratio is preferably within the range of from 3.4 times to 10 times in terms of cost reduction and the like.

As a result of evaluating the sound absorption of the examples and comparative examples, which are samples with different expansion ratios and thicknesses, it was observed that among samples with a typical thickness within the range of from 0.7 mm to 5.0 mm and a typical expansion ratio of 8 times or less, samples with a mass per unit area within the range of 0.090 g/cm$^2$ or less exhibit remarkable sound absorption. Therefore, for the duct for a vehicle air conditioner, which is used under a variety of constraints, it can be seen that it is preferable to use a cylindrical foam molded body that has an expansion ratio of from 3.4 times to 8 times, a thickness of from 0.7 mm to 5.0 mm, a mass per unit area of 0.090 g/cm2 or less and offers both good heat insulation and good sound absorption. Further, it can also be seen that the expansion ratio is preferably within the range of from 5 times to 8 times for a further improvement in heat insulation.

Further, it can be seen that foam molded bodies with a closed cell ratio of 60% or more, particularly 75% or more, such as the examples, exhibit good heat insulation and strength.

Further, it can be seen that foam molded bodies with an average cell size of from 50 μm to 700 μm, such as the examples, do not experience air leakage and exhibit good heat insulation.

Further, it can be seen that foam molded bodies that are produced by foaming a thermoplastic resin such as a polyolefin resin (e.g. polypropylene), such as the examples, exhibit good moldability and are therefore suitable for ducts for vehicle air conditioners, which is used under a variety of constraints.

While the present invention is described with some embodiments and examples, the present invention is not limited thereto, and various changes can be made within the gist of the present invention.

The entire disclosure of Japanese patent application No. 2013-250218 (filing date: Dec. 3, 2013) is incorporated herein by reference.

REFERENCE SIGNS LIST 1A, 1B duct for a vehicle air conditioner
2 foam molded body
4 sound absorbing urethane
10 noise source (heating, ventilating and air conditioning system (HVAC))
RC reverberation chamber
SC soundproof chamber

The invention claimed is:

1. A foam molded body having a cylindrical shape and produced by foaming a resin, wherein:
   the foam molded body has
      a mass per unit area of from 0.045 g/cm$^2$ to 0.075 g/cm$^2$,
      an expansion ratio of from 4.8 to 6.7 times, and
      a closed cell ratio of from 79% to 86%.

2. The foam molded body according to claim 1, wherein the foam molded body has an average cell size of from 50 μm to 700 μm.

3. The foam molded body according to claim 1, wherein the resin is a thermoplastic resin.

4. The foam molded body according to claim 2, wherein the resin is a thermoplastic resin.

5. The foam molded body according to claim 1, wherein the resin is a polyolefin resin.

6. The foam molded body according to claim 2, wherein the resin is a polyolefin resin.

7. The foam molded body according to claim 3, wherein the resin is a polyolefin resin.

8. The foam molded body according to claim 4, wherein the resin is a polyolefin resin.

9. The foam molded body according to claim 1, wherein the resin is polypropylene or polyethylene.

10. The foam molded body according to claim 2, wherein the resin is polypropylene or polyethylene.

11. The foam molded body according to claim 3, wherein the resin is polypropylene or polyethylene.

12. The foam molded body according to claim 4, wherein the resin is polypropylene or polyethylene.

13. The foam molded body according to claim 5, wherein the resin is polypropylene or polyethylene.

14. The foam molded body according to claim 6, wherein the resin is polypropylene or polyethylene.

15. The foam molded body according to claim 7, wherein the resin is polypropylene or polyethylene.

16. The foam molded body according to claim 8, wherein the resin is polypropylene or polyethylene.

17. A duct for an air conditioner, comprising a foam molded body, wherein:
the foam molded body has a cylindrical shape and is produced by foaming a resin, and
the foam molded body has
a mass per unit area of from 0.045 g/cm$^2$ to 0.075 g/cm$^2$,
an expansion ratio of from 4.8 to 6.7 times, and
a closed cell ratio of from 79% to 86%.

18. The duct for the air conditioner according to claim 17, wherein:
the foam molded body has an average cell size of from 50 μm to 700 μm, and
the resin is polypropylene or polyethylene.

19. A duct for a vehicle air conditioner, comprising a foam molded body, wherein
the foam molded body has a cylindrical shape and is produced by foaming a resin,
the foam molded body has
a mass per unit area of from 0.045 g/cm$^2$ to 0.075 g/cm$^2$,
an expansion ratio of from 4.8 to 6.7 times, and
a closed cell ratio of from 79% to 86%.

20. The duct for the vehicle air conditioner according to claim 19, wherein
the foam molded body has an average cell size of from 50 μm to 700 μm, and
the resin is polypropylene or polyethylene.

* * * * *